United States Patent
Seifert

(10) Patent No.: US 12,203,449 B2
(45) Date of Patent: Jan. 21, 2025

(54) METHOD FOR DETERMINING A WIND SPEED IN THE REGION OF A WIND TURBINE, AND A WIND TURBINE FOR PERFORMING THE METHOD

(71) Applicant: Wobben Properties GmbH, Aurich (DE)

(72) Inventor: Benjamin Seifert, Bremen (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 420 days.

(21) Appl. No.: 17/623,422

(22) PCT Filed: Jul. 1, 2020

(86) PCT No.: PCT/EP2020/068441
§ 371 (c)(1),
(2) Date: Dec. 28, 2021

(87) PCT Pub. No.: WO2021/001389
PCT Pub. Date: Jan. 7, 2021

(65) Prior Publication Data
US 2022/0349381 A1 Nov. 3, 2022

(30) Foreign Application Priority Data
Jul. 4, 2019 (DE) ............ 10 2019 118 036.8

(51) Int. Cl.
*F03D 7/04* (2006.01)
*F03D 7/02* (2006.01)

(52) U.S. Cl.
CPC ............ *F03D 7/046* (2013.01); *F03D 7/0224* (2013.01); *F03D 7/028* (2013.01); *F05B 2270/32* (2013.01); *F05B 2270/328* (2013.01)

(58) Field of Classification Search
CPC ........ F03D 7/046; F03D 7/0224; F03D 7/028; F03D 17/00; F05B 2270/32; F05B 2270/328; F05B 2270/8042; Y02E 10/72
See application file for complete search history.

(56) References Cited

U.S. PATENT DOCUMENTS

| | | | |
|---|---|---|---|
| 2010/0135789 A1 | 6/2010 | Zheng et al. | |
| 2011/0204635 A1 | 8/2011 | Miller | |
| 2012/0179376 A1* | 7/2012 | O'Brien | G01P 5/001 702/3 |
| 2017/0122289 A1* | 5/2017 | Kristoffersen | F03D 7/0224 |
| 2019/0048853 A1 | 2/2019 | Engelken | |

FOREIGN PATENT DOCUMENTS

| | | |
|---|---|---|
| EP | 1 793 123 A2 | 6/2007 |
| EP | 3 158 191 B1 | 12/2017 |
| WO | 2013/000468 A1 | 1/2013 |

* cited by examiner

*Primary Examiner* — Joseph Ortega
(74) *Attorney, Agent, or Firm* — Seed IP Law Group LLP

(57) ABSTRACT

A method of determining a corrected wind speed in the region of a wind turbine including the steps of measuring a wind speed in the region of a wind turbine, determining a force exerted on at least one rotor blade by the wind, determining a wind speed difference value which is dependent on the determined force and determining a corrected wind speed by correcting the measured wind speed in dependence on the wind speed difference value.

A wind turbine for carrying out the method.

17 Claims, 3 Drawing Sheets

| Corrected wind speeds | 302 | Measured wind speeds | 304 |
|---|---|---|---|
| ... | | ... | |
FIG. 3
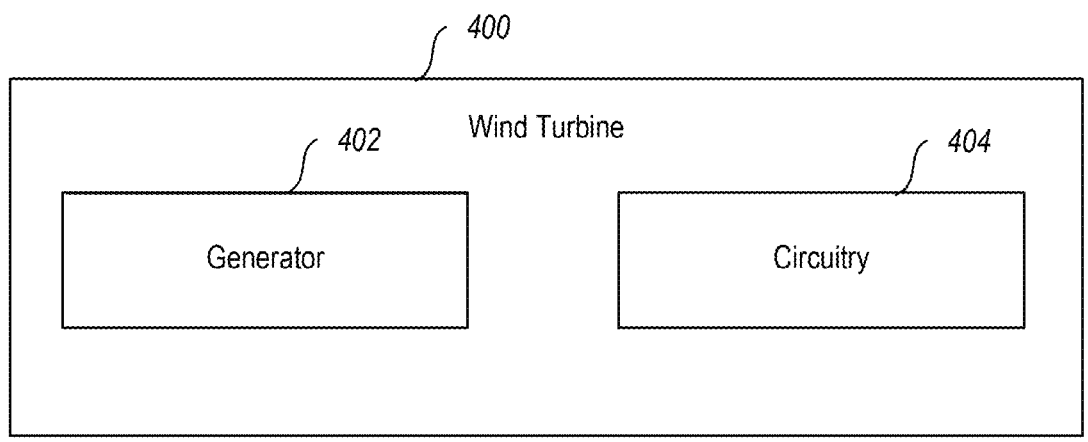
FIG. 4
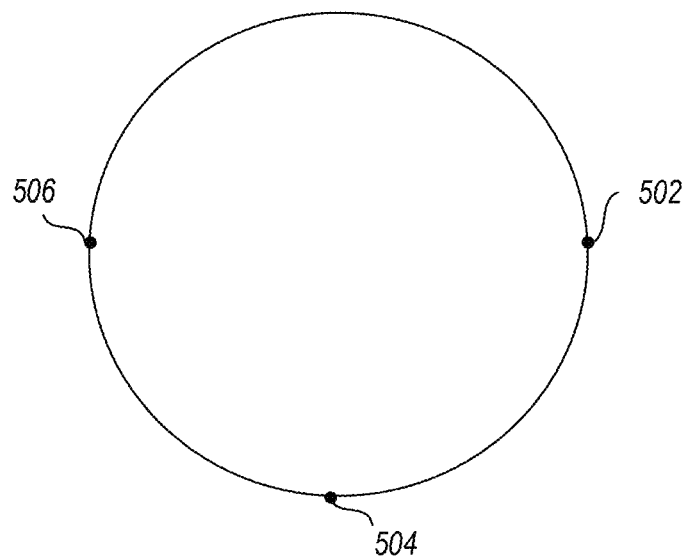
FIG. 5

METHOD FOR DETERMINING A WIND SPEED IN THE REGION OF A WIND TURBINE, AND A WIND TURBINE FOR PERFORMING THE METHOD

BACKGROUND

Technical Field

The invention concerns the field of wind turbines and in that respect in particular wind speed measurement in the region of wind turbines.

Description of the Related Art

Measurement of the wind speed in the region of a wind turbine has always caused problems. That is because a rotor of a wind turbine, in particular with the surfaces of its rotor blades, already influences the wind field in the stopped condition and to an increased degree in operation of the wind turbine and thus in particular in the near region of the wind turbine wind speed measurement does not give the actual wind speed which prevails in the region which is uninfluenced by the wind turbine. The near region of a wind turbine is usually identified as the region which extends around the wind turbine in a radius of 2.5 times the rotor diameter.

The reason for this influence is that energy delivery from the wind for conversion into a forward or rotary movement of the rotor blades for generating electrical power entails a reduction in the flow speed and a build-up of air on the windward side of the wind turbine. In that respect the windward side denotes the region upstream of the wind turbine, that is to say the region from which the wind meets the rotor of the wind turbine. The windward side is therefore to be assumed to be changing in dependence on the current wind direction.

The reduction in the flow speed and the build-up of air means that a part of the air flowing towards the rotor has to evade a rotor surface formed by the rotor. Thus the reduction in the flow speed, the build-up of air and the corresponding deflection of the air flow generates a region in which the wind speed is influenced in dependence on the energy taken by the wind turbine. Precise measurement of the wind speed is therefore not possible.

For that reason wind measurement masts are frequently set up outside the near field of a wind turbine, more specifically in the far field, that is to say in the region which is outside a distance of 2.5 times the rotor diameter of a wind turbine in order to determine the actual wind speed. In that region the wind field is to be assumed very substantially as not being influenced by the wind turbine so that it is possible to determine an actual wind speed.

The use of wind measurement masts however is linked to high cost levels so that the use thereof, in particular in relation to individual wind turbines, has in part a significant effect on the overall costs of the project. If therefore no wind measurement mast is provided wind measurement can only be implemented in the region of the wind turbine and it is only possible to extrapolate the actual wind speed on the basis of the current operating state, more specifically in particular on the basis of the energy currently being taken from the wind. The estimation to be performed in that case however is generally inaccurate. If accordingly a wind measurement mast is set up outside a distance of 2.5 times the rotor diameter in front of a wind turbine to be measured then the wind field comprising wind strength, direction, shear, veer, turbulence and other characteristic parameters which impinges on the wind turbine is no longer the same one that the wind measurement mast measured. Measurement inaccuracy increases greatly with the distance but in particular with the deviation in direction of the wind from the direction of the wind measurement mast to the wind turbine. The closer the measurement is to the wind turbine the correspondingly less is the uncertainty in the measurement result but in return the influence of the turbine on the measurement increases.

Precise knowledge of the wind speed as is accordingly possible only with difficulty even with wind measurement masts permits particularly efficient operation of a wind turbine. By way of example, in particular at low wind speeds, a comparatively high exciter current in respect of a wind turbine equipped with a separately excited generator is necessary to take the maximum possible power from the wind. That high exciter current then in part exceeds the energy yield so that a wind turbine is then operating inefficiently. If the precise wind speed is known it is therefore appropriate at low wind speeds to reduce the exciter current until the maximum possible power is in fact not taken from the wind but a positive energy balance sheet is maintained.

On the German patent application from which priority is claimed the German Patent and Trade Mark Office searched the following documents: US 2011/0204635 A1 and US 2019/0048853 A1.

BRIEF SUMMARY

Provided are techniques to determine a wind speed which is uninfluenced by a wind turbine in the region of the wind turbine in the simplest and most inexpensive fashion possible.

Provided is a method that includes the operation of determining a wind speed in the region of a wind turbine. That wind speed to be determined is also referred to as the actual wind speed or corrected wind speed. For determining the corrected wind speed firstly a wind speed in the region of a wind turbine is measured, which is further also referred to as the measured wind speed and thus differs conceptually from the corrected wind speed. In addition a force exerted on at least one rotor blade by the wind is determined. With the determined force, a wind speed difference value is determined or derived therefrom. Therefore a wind speed difference value is determined that is dependent on the determined force. The force in that respect can be ascertained by direct measurement or by indirect measurement and back calculation, for example by the measurement of pressures or pressure differences at the surface of at least one rotor blade, or by a comparative measurement of the wind speed in front of and behind the rotor blade.

In addition the corrected wind speed is determined, in which respect that is effected by correcting the measured wind speed in dependence on the wind speed difference value. Therefore a corrected wind speed is determined by the measured wind speed being altered or corrected in dependence on the wind speed difference value which in turn is dependent on the determined force, in order in that way to obtain the corrected wind speed.

Preferably measurement of the wind speed takes place in the region of the wind turbine and the operation of determining the force exerted on at least one rotor blade by the wind takes place substantially at identical moments in time, in particular with a time difference of less than one second, less than two seconds or less than four seconds.

Thus based on a measured wind speed and a force exerted on the rotor blade at the moment in time of measurement it is possible to exactly ascertain what blade load is exerted on the wind turbine at that moment in time or that measurement time.

The disclosure is based on the realization that modern wind turbines are based on the lift principle so that the energy taken from the wind is converted on the one hand into a blade load and on the other hand into a propulsion effect. That propulsion force can be used for energy generation. If now the blade load is determined then it is possible conversely also to determine the propulsion effect and thus the change resulting therefrom in the wind field, more specifically in particular a reduction in the flow speed, a build-up of air and accordingly an amount of deviating flow, from which the wind speed difference value can then be derived or ascertained. Consequently the corrected wind speed can be determined in a simple fashion.

A highly precise actual wind speed from a measurement of a wind speed which is afflicted with errors can be determined in that way in order to operate the wind turbine. Efficient operation is thus possible even without the use of wind measurement masts and thus less expensively.

According to a first embodiment measurement of the wind speed includes measurement of the wind speed being effected at a first distance or at a first position at the windward side of the wind turbine. Furthermore the wind speed difference value is then additionally determined in dependence on the first distance. In that respect account is taken of the fact that for example measurement of the wind speed is already effected on the one hand in the region influenced by the wind turbine or on the other hand in a region which is not yet influenced, for example at a greater distance. That is dependent for example on the design configuration of the measuring means for measuring the wind speed. Depending on whether now therefore a wind speed which is in the non-influenced region or in the influenced region is measured, a wind speed difference value is then adapted. In that case in particular account is also taken of how greatly for example the wind turbine is already to be assumed to be influenced by the rotor at the first distance or at the first position. If for example a wind field is determined on the basis of the determined force, in particular also in regard to its dynamics, then the nature and the level of the influence at the distance or the point of the determined wind field can be precisely used on the basis of the distance or the position.

According to a further embodiment the method additionally includes establishing a second distance at the windward side of the wind turbine or a second position. The second distance or the second position then corresponds to the distance or the position at which the actual wind speed is to be determined. In addition in this embodiment the operation of determining the wind speed difference value is additionally correspondingly effected in dependence on the second distance.

Particularly advantageously by establishing the first distance and the second distance it is thus possible for example to measure a wind speed with the first distance, from which then it is possible to determine a corrected wind speed at a point at a different distance from the distance on which the measurement was based by means of the wind speed difference value which is dependent on the determined force, the first distance and the second distance. In that way it is also possible to determine the corrected wind speed at a point which is also influenced by the wind turbine.

According to a further embodiment the second distance or the second position at which the corrected wind speed is to be determined corresponds to a distance or a position which is in a region that is outside the near field region of the wind turbine. The near field region is defined in particular as a region around the wind turbine at a radius that corresponds to the diameter of the rotor of the wind turbine, double the diameter of the rotor of the wind turbine or two and a half times the diameter of the rotor of the wind turbine. Accordingly the corrected or actual wind speed is determined in the uninfluenced region of the wind turbine.

In a further embodiment the first distance, that is to say the distance at which the wind speed is measured, corresponds to a distance within the near field region or the first position corresponds to a position in the near field region. In particular the first distance corresponds to a distance of substantially 90 meters, 60 meters or 40 meters relative to the wind turbine. Advantageously the first distance is at least in the region between 90 meters and 60 meters, 60 meters and 40 meters and 40 meters and 0 meters from the wind turbine.

By establishing the second distance or the second position outside the near field region and the first distance or the first position within the near field region it is therefore possible to exactly determine uninfluenced wind speeds on the basis of the wind speed difference value, therefore only in dependence on the determined force, even when the wind speed measurement is effected within the near field region, that is to say the region which is already influenced.

According to a further embodiment measurement of the wind speed is effected with a lidar system. Lidar means light detection and ranging and is also referred to as ladar, which corresponds to the abbreviation for laser detection and ranging. A lidar system makes it possible to set or predetermine different first distances, in particular distances substantially of 90, 60 or 40 meters, for a measurement in order to carry out measurements in regions which are influenced differently.

According to a further embodiment the method includes creating a table or function by storing corrected wind speeds in conjunction with the wind speed measured with the corresponding lidar system. By means of the table or function it is then possible to convert a lidar measurement in the near field without wind speed correction difference value into a wind speed outside the near field by means of the table or function. The table and/or function is thus also suitable as a calibration table or calibration function, in particular for calibration of the lidar system.

According to a further embodiment the wind speed difference value is ascertained in dependence on the determined force by the determined force being converted into the wind speed difference value by means of at least one stored function or at least one stored table. Simple determination of the wind speed difference value is possible in that way.

According to a further embodiment the operation of determining the wind speed difference value is additionally effected in dependence on the rotary speed and/or blade position. In that way a current lift of the rotor blades can be measured in a simple fashion and, together with the blade flexing which indicates the blade load, precise knowledge is obtained about the level of the proportions of the energy taken from the wind, for the blade load and for propulsion. The wind speed difference value and thus the corrected wind speed can thus be particularly accurately determined.

According to a further embodiment correction of the measured wind speed is effected in dependence on the wind speed difference value by the wind speed difference value being subtracted from the measured wind speed or added thereto. The corrected wind speed can be particularly easily determined from the measured speed in that way.

According to a further embodiment the operation of determining a force exerted on at least one rotor blade by the wind is effected by measurement values being assessed by at least one sensor in or at at least one rotor blade. The sensor is in particular a measuring device for detecting extending or compressing deformations of the rotor blade, more specifically in particular a strain gauge or at least one pressure sensor. Preferably the pressure sensor is an optical pressure sensor. Alternatively the sensor can also include a camera system. The exerted force can be particularly easily and accurately measured by means of such a sensor system.

According to a further embodiment the at least one sensor for measuring a force exerted on at least one rotor blade by the wind is calibrated at least before the first force measurement. That is effected by the rotor blade being moved into different positions, in particular a 3 o'clock position, 6 o'clock position and/or 9 o'clock position, and by measured flexural differences of the rotor blade being compared to expected flexural differences in the different positions. Here a 3 o'clock position denotes a horizontal position of the rotor blade, which extends to the right from the windward-side direction of view on to the rotor hub, a 6 o'clock position denotes a position of the rotor blade extending perpendicularly downwardly from the rotor blade hub and a 9 o'clock position denotes a horizontal position extending towards the left from the rotor blade. The sensors can thus be easily calibrated.

According to a further embodiment a torque of a generator of the wind turbine is set in dependence on the corrected wind speed. The wind turbine can thus be set at a particularly suitable operating point which is dependent on an uninfluenced wind speed.

In addition, provided is a wind turbine adapted to carry out a method according to one of the above-mentioned embodiments. In particular the wind turbine includes a lidar system for measuring the wind speed.

According to an embodiment the wind turbine also has at least one sensor for determining a force exerted on at least one rotor blade. Preferably the wind turbine includes circuitry, such as a processor, in order to determine the difference and correct a measured wind speed on the basis of the determined force in accordance with an embodiment of the method.

BRIEF DESCRIPTION OF THE SEVERAL VIEWS OF THE DRAWINGS

Further embodiments are set forth by means of the configurations described by way of example in greater detail with reference to the Figures in which:

FIG. 3 shows a table for storing corrected wind speeds in conjunction with measured wind speed, FIG. 4 shows a wind turbine including a generator and circuitry, FIG. 5 shows a 3 o'clock position, 6 o'clock position and 9 o'clock position into which the rotor blade is moved.

DETAILED DESCRIPTION

Figure 1:
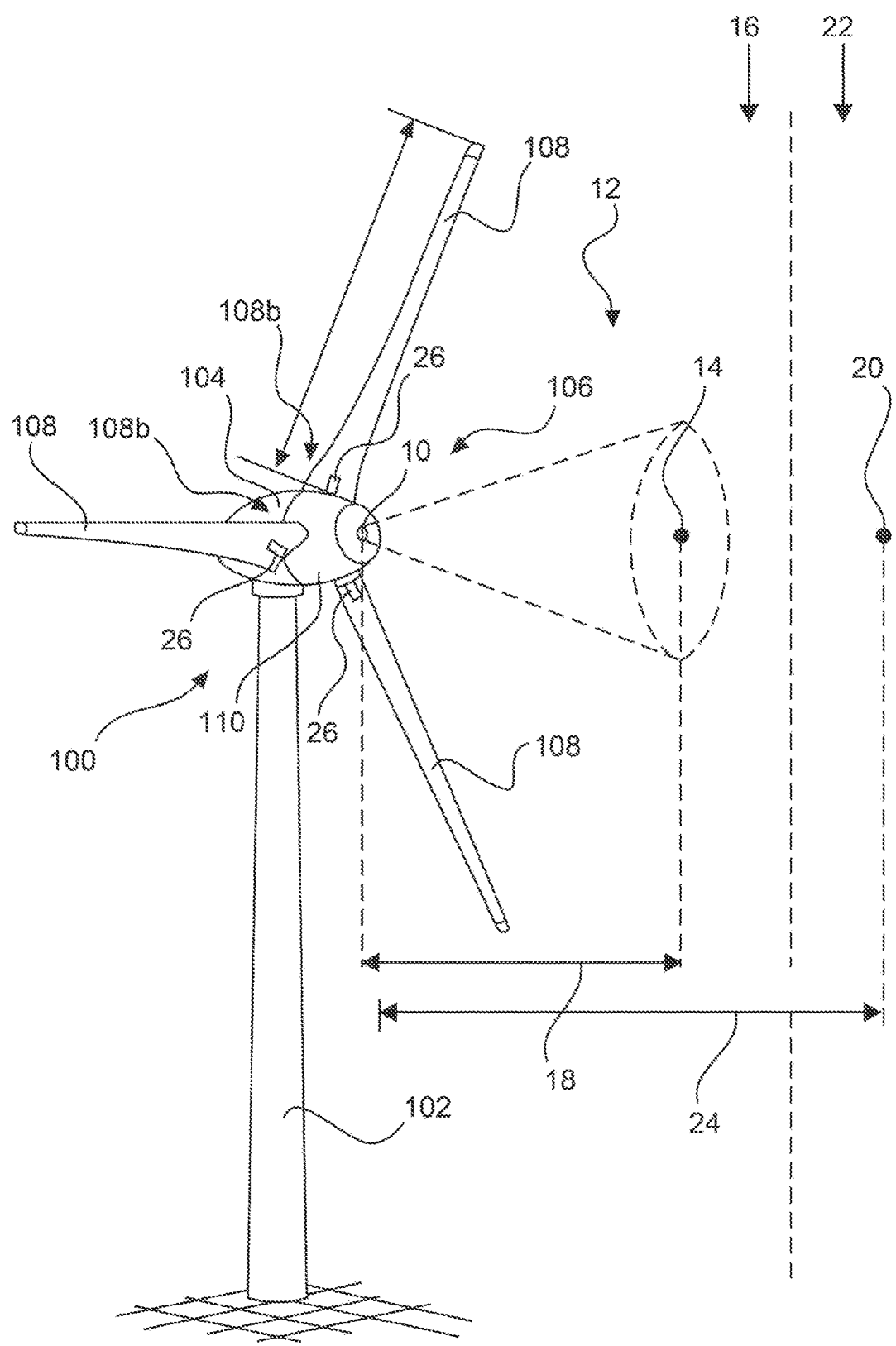
FIG. 1 shows a wind turbine.

FIG. 1 shows a diagrammatic view of a wind turbine according to an embodiment of the invention. The wind turbine 100 has a tower 102 and a nacelle 104 on the tower 102. Provided on the nacelle 104 is an aerodynamic rotor 106 having three rotor blades 108 and a spinner 110. In operation of the wind turbine the aerodynamic rotor 106 is caused to rotate by the wind and thus also rotates an electrodynamic rotor or rotor member of a generator which is directly or indirectly coupled to the aerodynamic rotor 106. The electric generator is disposed in the nacelle 104 and generates electrical energy. The pitch angles of the rotor blades 108 can be altered by pitch motors at the rotor blade roots 108b of the respective rotor blades 108.

The wind turbine 100 serves to carry out an embodiment of the method. For that purpose the wind turbine 100 has a lidar system 10 which is arranged in the spinner 110 and is adapted to determine wind speeds at the windward side 12 of the wind turbine 100. The lidar system 10 is preferably fixedly mounted, wherein determination of the wind speed at the windward side 12 is made possible by a yaw drive (not shown) tracking the nacelle 104 of the wind turbine 100 to the wind direction.

By way of example in FIG. 1 the wind speed is determined at a first position 14 in the near field region 16 of the wind turbine 100. The first position 14 is for example at a first distance (windward distance) 18 from the wind turbine 100 at the windward side 12. In accordance with the method, with the wind speed determined at the first position 14, it is possible to determine the wind speed at a second position 20 in the far field (region outside the near field region 16) 22 of the wind turbine 100. For that purpose the second position 20 is at a second distance 24 at the windward side 12 of the wind turbine 100.

For determining the corrected wind speed in the second position 20 from the measured wind speed in the first position 14 the force exerted on the rotor blades 108 by the wind is determined by means of sensors 26 in the region of the blade roots 108b of the rotor blades 108. A wind speed difference value is determined on the basis of that force and the measured speed at the point 14 is corrected with the wind speed difference value.

Figure 2:
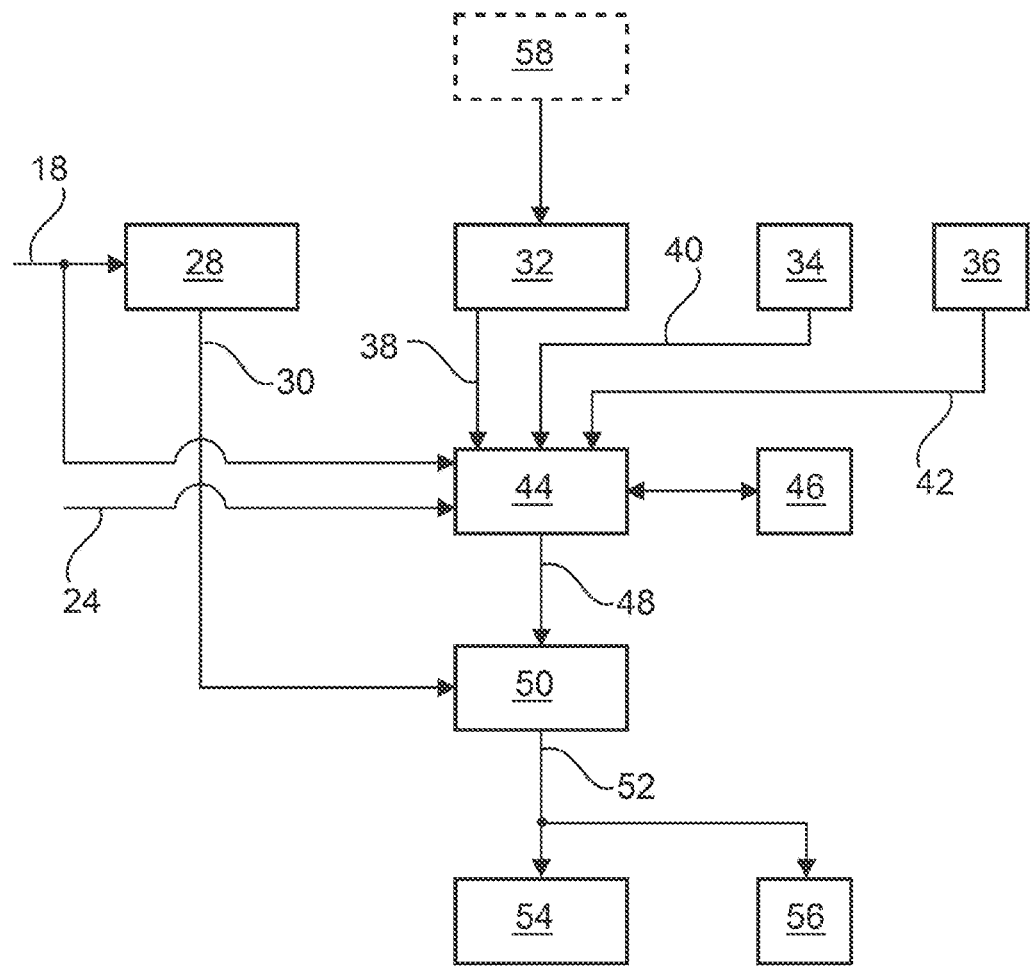
FIG. 2 shows the steps in the method.

FIG. 2 shows the steps in the method. In step 28 a wind speed is measured. For that purpose a first distance 18 is set, preset or predetermined. The wind speed which was measured at the first distance 18 is then output as a measured wind speed 30. In parallel or substantially at the same time a force is determined in step 32. In addition the current rotary speed 40 of the wind turbine is determined in a step 34 and the blade position 42 of the wind turbine is determined in a step 36.

The first distance 18, the determined force 38, the measured rotary speed 40 and the measured blade position 42 are passed to a step 44 for determining a wind speed difference value 48 as an input value. In the step 44 for determining a wind speed difference value 48 a second distance 24 is also predetermined as an input value, by which the corrected wind speed is to be determined. On the basis of the input values 18, 24, 38, 40, 42 the wind speed difference value 48 is determined by means of a function 46 and the wind speed difference value 48 is then output.

Together with the measured wind speed 30 the corrected wind speed 52 is then determined in a correction step 50. The corrected wind speed 52 is output after the correction and in a step 54 a torque of a generator of the wind turbine 100 is set in dependence on the corrected wind speed 52. Additionally or alternatively the corrected wind speed 52 at the second distance 24 is stored in a calibration table in a step 56. The calibration table can for example be later used to determine when speeds 52 at the second distance 24 even without determining the force 38, solely by measurement of the wind speed 30 at the first distance 18.

The sensors 26 are calibrated in an optional step 58 for determining the force in the step 32.

FIG. 3 shows a table 300 for storing corrected wind speeds 302 in conjunction with measured wind speed 304.

FIG. 4 shows a wind turbine 400 including a generator 402 and circuitry 404 (e.g., a processor).

FIG. 5 shows a 3 o'clock position 502, 6 o'clock position 504 and 9 o'clock position 506 into which the rotor blade is moved. The 3 o'clock position denotes a horizontal position of the rotor blade, which extends to the right from the windward-side direction of view on to the rotor hub, a 6 o'clock position denotes a position of the rotor blade extending perpendicularly downwardly from the rotor blade hub and a 9 o'clock position denotes a horizontal position extending towards the left from the rotor blade.

The invention claimed is:

1. A method of determining a corrected wind speed of a wind turbine, the method comprising:
   measuring a wind speed in a region of the wind turbine, wherein measuring the wind speed includes:
      measuring the wind speed at a first distance windward of the wind turbine or at a first position
   determining a force exerted on at least one rotor blade from wind,
   establishing a second distance at the windward side of the wind turbine or a second position at which the corrected wind speed is to be determined, wherein:
      the second distance is a windward distance, or
      the second position is in a region outside a near field region of the wind turbine,
   determining a wind speed difference value, wherein the wind speed difference value depends on:
      the determined force,
      the first distance or the first position, and
      the second distance or the second position, and
   determining the corrected wind speed by correcting the measured wind speed in dependence on the wind speed difference value.

2. The method as claimed in claim 1 wherein the first distance is defined as a distance within the near field region of the wind turbine or the first position is defined as a position which is within the near field region.

3. The method as claimed in claim 2, wherein the first distance is a distance from the wind turbine chosen from at least one of the following:
   40 meters,
   60 meters,
   90 meters,
   between 0 and 40 meters,
   between 40 and 60 meters, or
   between 60 and 90 meters.

4. The method as claimed in claim 1 wherein measuring the wind speed comprises using a lidar system to measure the wind speed.

5. The method as claimed in claim 1 wherein determining the corrected wind speed outside the near field region comprises using a table or function with the corrected wind speed and the corresponding measured wind speed.

6. The method as claimed in claim 1 wherein the wind speed difference value is determined in dependence on the determined force being converted into the wind speed difference value by at least one stored function or at least one stored table.

7. The method as claimed in claim 1 wherein determining the wind speed difference value further depends on the rotary speed and/or blade position.

8. The method as claimed in claim 1 wherein correcting the measured wind speed depends on the wind speed difference value being subtracted from or added to the measured wind speed.

9. The method as claimed in claim 1 wherein determining the force exerted on at least one rotor blade by the wind comprises using measurement values from at least one sensor arranged in or at least one rotor blade, wherein the at least one sensor is a measuring device for detecting, extending, or compressing deformations.

10. The method as claimed in claim 9 further comprising:
   the at least one sensor for determining a force exerted on at least one rotor blade by the wind is calibrated before determining the force, and
   rotating the at least one rotor blade by moving the rotor blade to a plurality of different positions, and
   repeating the steps of determining the force, determining the wind speed difference value, and determining a corrected wind speed at each position of the plurality of different positions.

11. The method as claimed in claim 10, wherein the different positions include at least one position chosen from a 3 o'clock position, a 6 o'clock position, or a 9 o'clock position.

12. The method as claimed in claim 9, wherein the at least one sensor includes at least one or more sensors chosen from a strain gauge, a pressure sensor, an optical pressure sensor, or a camera.

13. The method as claimed in claim 1 comprising setting a torque by setting an exciter current of a generator of the wind turbine in dependence on the determined wind speed.

14. The wind turbine comprising a circuitry and one or more sensors to carry out the method as claimed in claim 1.

15. The wind turbine as claimed in claim 14 wherein the one or more sensors includes a lidar system for measuring the wind speed and at least one sensor arranged in or on the at least one rotor blade for determining the force exerted on the at least one rotor blade by the wind.

16. The method as claimed in claim 1 wherein the near field region is defined as a region within a radius around the wind turbine, wherein the radius corresponds to a diameter of the rotor of the wind turbine.

17. The method as claimed in claim 1 wherein the near field region is defined as a region within a radius around the wind turbine, wherein the radius is at least two times the diameter of the rotor of the wind turbine.

* * * * *